United States Patent [19]
Vaishnav

[11] 3,989,145
[45] Nov. 2, 1976

[54] CORE TRANSFER APPARATUS

[75] Inventor: Dolar Harshadrai Vaishnav, Cuyahoga Falls, Ohio

[73] Assignee: The Firestone Tire & Rubber Company, Arkron, Ohio

[22] Filed: Jan. 20, 1975

[21] Appl. No.: 542,318

[52] U.S. Cl. ................................. 214/1 R; 214/89
[51] Int. Cl.² ............................................. B25J 3/00
[58] Field of Search ............ 214/1 R, DIG. 3, 1 BB, 214/89, 309; 269/55, 56; 198/218

[56] References Cited
UNITED STATES PATENTS

| | | | |
|---|---|---|---|
| 1,326,874 | 12/1919 | Macbeth | 214/89 |
| 3,065,499 | 11/1962 | Brundage | 214/1 BB |
| 3,164,268 | 1/1965 | Ericson | 214/1 R |
| 3,194,418 | 7/1965 | Howles | 214/89 |
| 3,343,208 | 9/1967 | Pacciarini | 214/1 BB |
| 3,513,990 | 5/1970 | Wolle | 214/309 |
| 3,825,131 | 7/1974 | Batson | 214/89 |
| 3,887,082 | 6/1975 | Posselt | 214/1 BB |
| 3,904,050 | 9/1975 | Kimura | 214/89 |

*Primary Examiner*—Robert R. Song
*Assistant Examiner*—John A. Carroll

[57] ABSTRACT

A core transfer apparatus is disclosed which performs the function of transporting a core to a centrifugal tire casting machine; and after a vehicle tire has been produced in the centrifugal casting machine, the apparatus performs the function of removing the finished tire, which is surrounded by a tread ring and which internally contains the core, from the machine. The apparatus includes a guideway and a chain-driven transfer carriage thereon. The transfer carriage has a frame with guide rods which guide the vertical movements of saddle members relative to the frame. The saddle members carry interchangeable pads for engaging the core and the tread ring.

8 Claims, 11 Drawing Figures

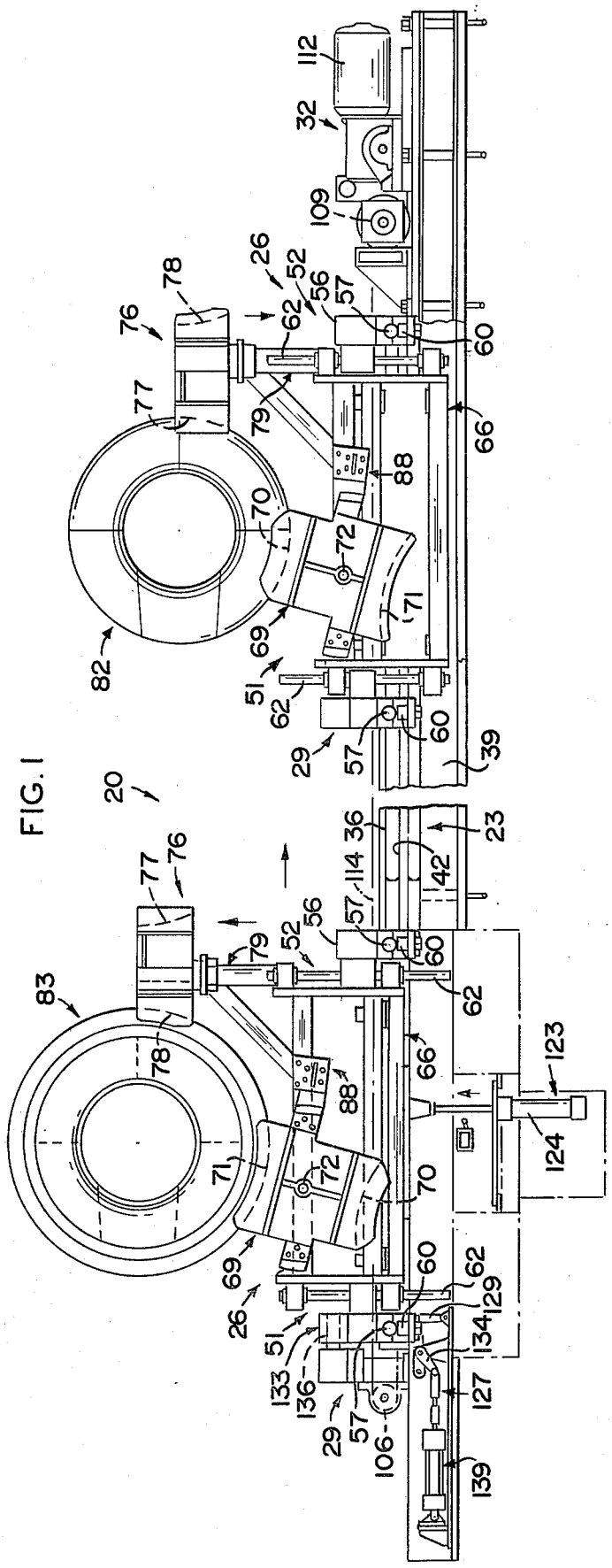

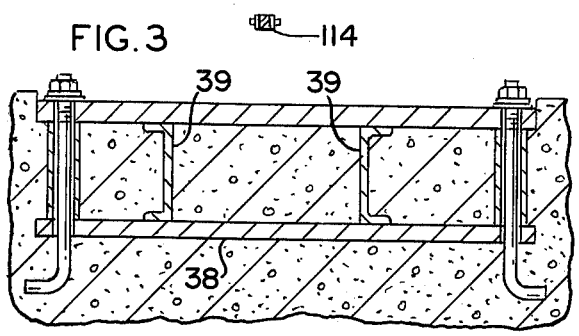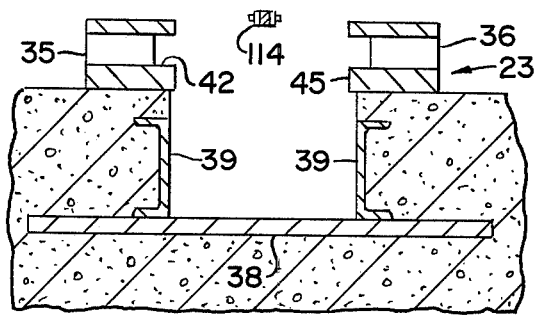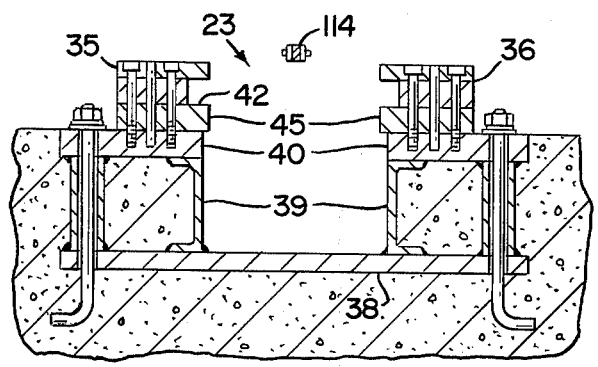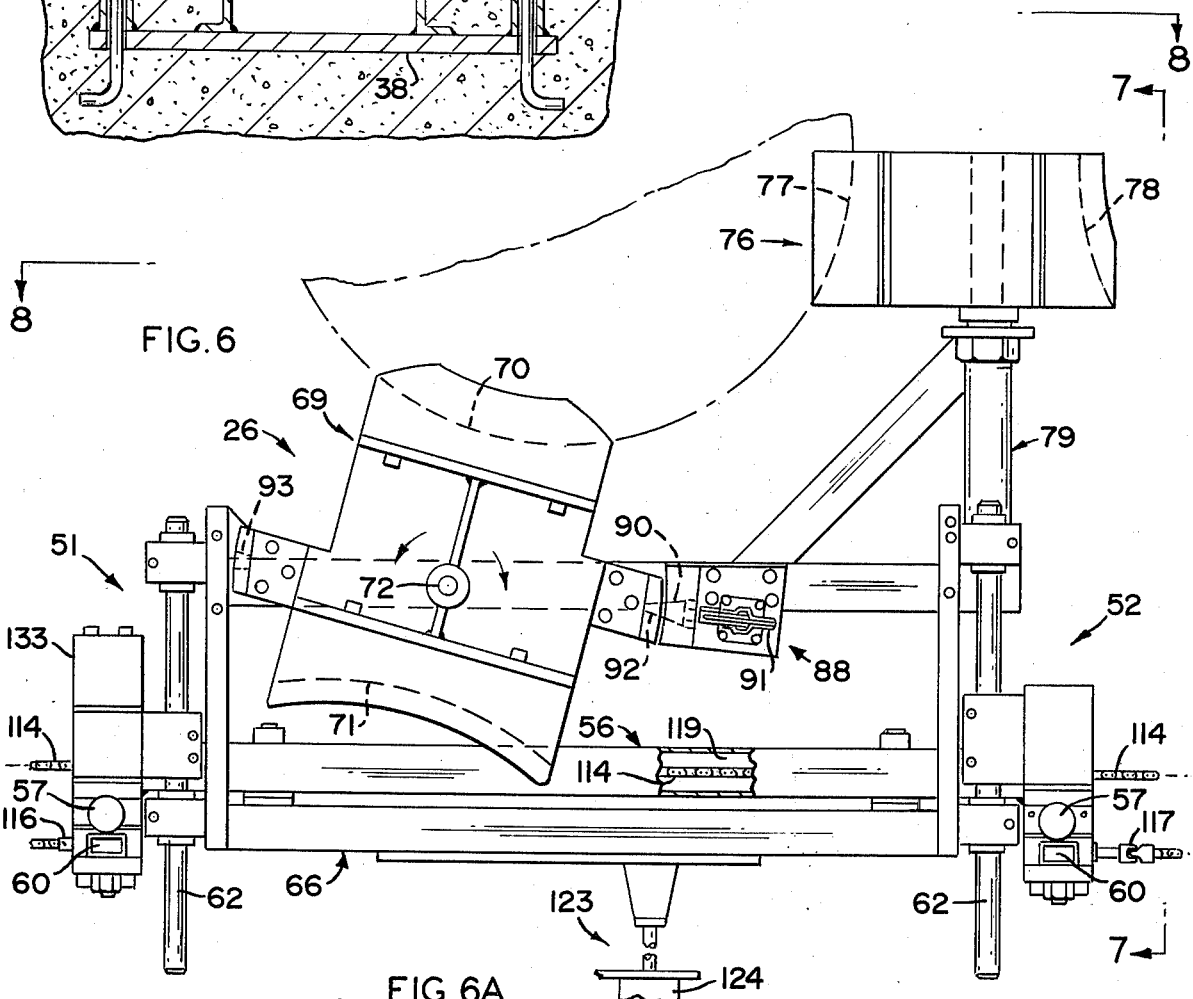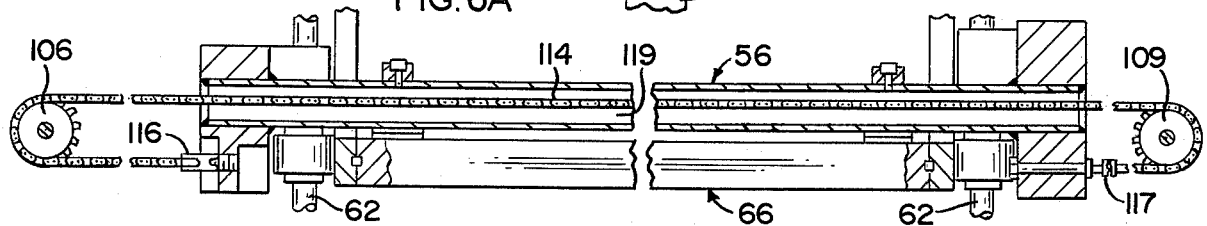

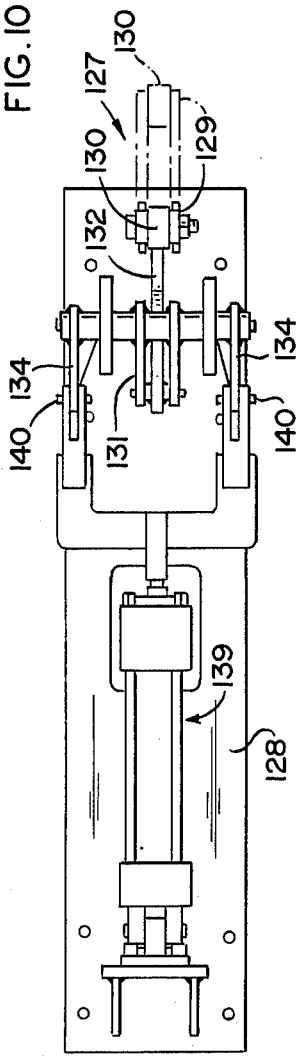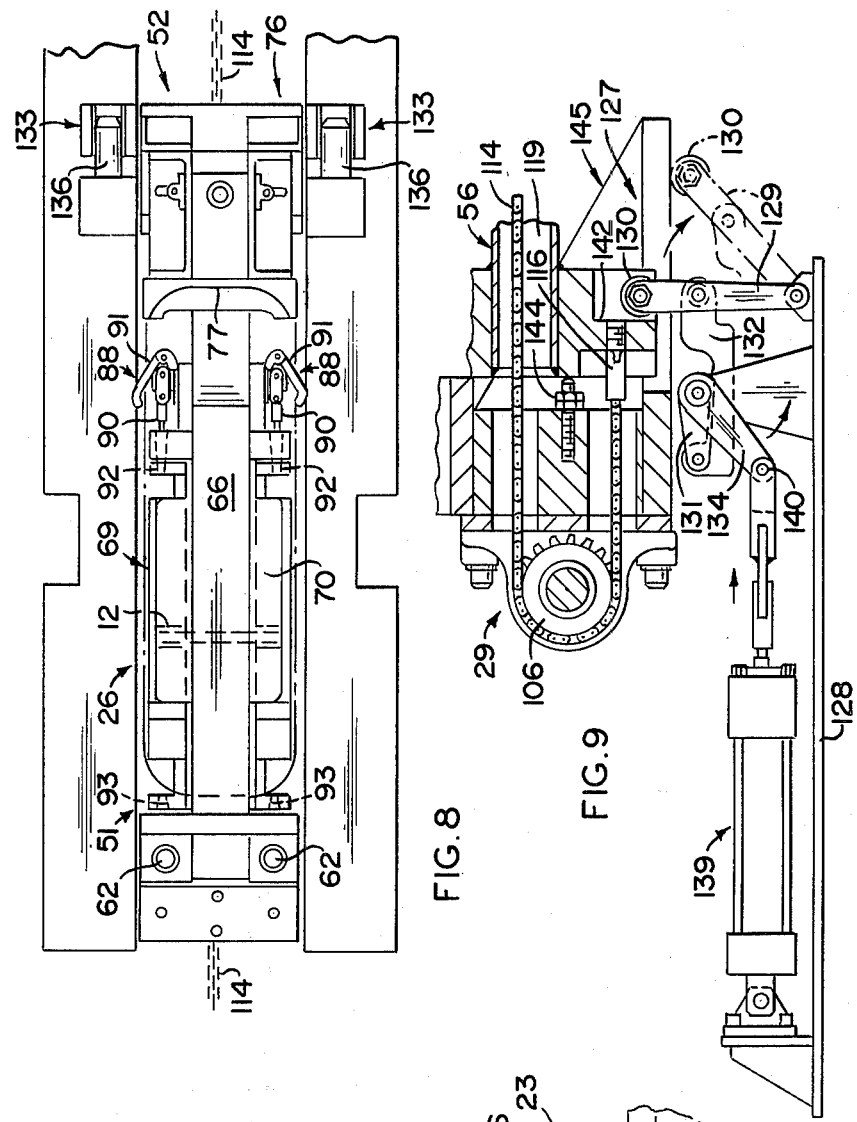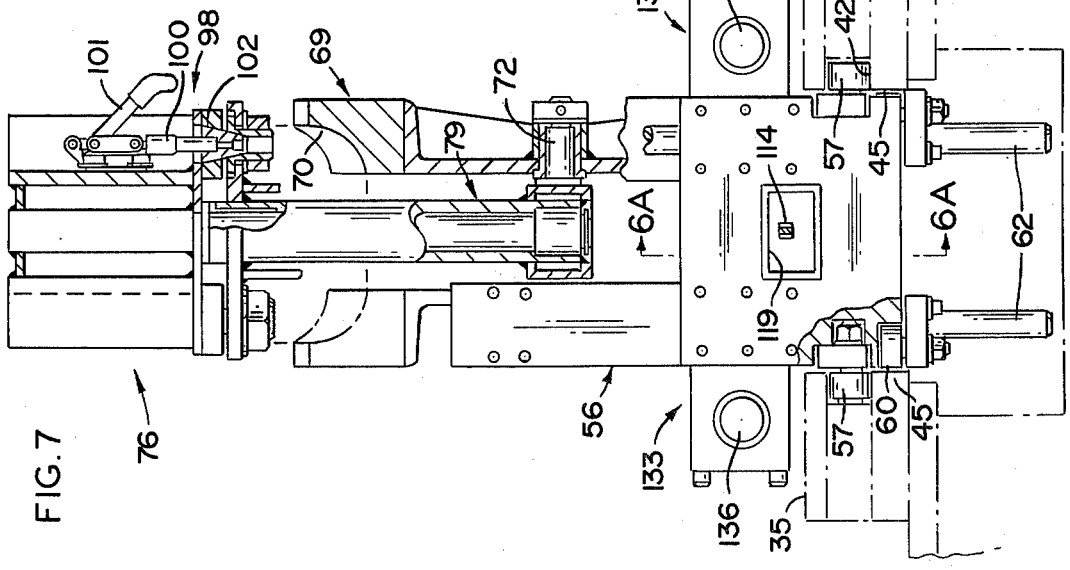

CORE TRANSFER APPARATUS

The present invention relates to mechanical handling systems and in the preferred embodiment illustrated herein relates to a core transfer apparatus or unit for transporting a core between a first station and a second station. The first station is appropriately located in or at a centrifugal tire casting machine. After the tire has been centrifugally cast, the function of the core transfer unit is to transport the completed tire, with the core contained therein and with a surrounding tread ring, from the first station back to the second station.

In the centrifugal casting of vehicle tires, it is common to utilize a core which may be made up of a plurality of segments, which are made of metal and quite heavy, approaching at times of on the order of 500 lbs. in total weight. The core is traditionally located in an appropriate position between two mold halves of a centrifugal casting machine and a liquid elastomeric material is introduced into the cavity formed between the core and the mold halves, while rotating the entire assembly about an axis, which results in the casting of a finished vehicle tire. It is then necessary to separate the two mold halves and remove the finished tire, containing the core and surrounded by a tread ring, from the centrifugal casting machine and move the same to another station where various operations may be performed thereon. Included among these operations are the removal of the tread ring and the removal of the core segments from the finished tire.

It is, therefore, the primary object of the present invention to provide a core transfer unit or mechanism which is capable of mechanically transporting the metallic core from a second station to a first station where the casting machine is located and accurately position the core relative to the centrifugal casting machine without the necessity of the normally backbreaking labor of workmen to accomplish this end result. As a continuing part of the object of the invention, the present device retrieves the core and the finished tire and transports it back to the second station in an extremely reliable and accurate manner.

Other objects and a fuller understanding of this invention may be had by referring to the following description and claims, taken in conjunction with the accompanying drawings, in which:

FIG. 1 is an elevational view of the core transfer unit of the present invention, which includes a carriage which is movable between first and second positions on a guideway and in this showing the carriage has been shown at the right in its second position with the saddle portion of the carriage in the down position and the carriage has, also, been shown in its first position at the left with the saddle portion of the carriage in raised position. It will be understood that the carriage has been shown in both positions in this view simply for ease in describing the two extreme longitudinal positions of the carriage;

FIG. 2 is a plan view of FIG. 1 with the carriage which is shown on the right of FIG. 1 omitted;

FIG. 3 is a view taken generally along the line 3—3 of FIG. 2;

FIG. 4 is a view taken generally along the line 4—4 of FIG. 2;

FIG. 5 is a view taken generally along the line 5—5 of FIG. 2;

FIG. 6 is an enlarged elevational view partially in section showing the carriage of FIG. 1, with the saddle member in its uppermost vertical position;

FIG. 6A is a fragmentary view similar to FIG. 6 with parts broken away to show the relationship of the drive chain and carriage;

FIG. 7 is an end view of the carriage shown in FIG. 6 taken generally along the line 7—7 of FIG. 6;

FIG. 8 is a plan view of FIG. 6 taken generally along the line 8—8 of FIG. 6;

FIG. 9 is an elevational view of a portion of the structure shown in FIG. 1, which is utilized in moving the carriage the approximately last 2 inches of its movement in traveling to the first station and showing a portion of the carriage fragmentarily; and FIG. 10 is a plan view of the mechanism shown in FIG. 9.

The core transfer unit of the present invention has been indicated generally by the reference numeral 20 and the overall arrangement of the unit is best seen in FIGS. 1 and 2 of the drawings. The core transfer unit involves or includes a guideway 23 and a carriage 26 which is movable between first and second positions in the guideway. The carriage is shown in FIG. 1 both in its first position (to the left) and in its second position (to the right). The unit 20, also, includes a carriage location mechanism 29 at the first position of the carriage and a drive means 32 for moving the carriage back and forth between its first and second positions in the guideway 23.

The structure of the guideway 23 will be first described and this includes first and second guide members 35 and 36 each of which comprises a sandwich of three members which have not been individually identified by a reference numeral. The structure of the guideway 23 is best seen in FIGS. 3, 4 and 5. It will be noted here that the guide members 35 and 36 are supported by a base plate 38 carrying spaced channels 39 and the channels 39 serve to support spaced support plates 40 in a manner shown best in FIG. 5. The guide members 35 and 36 are each provided with weight bearing surfaces 42 and lateral guidance surfaces 45 which support or engage rollers on the carriage 26 in a manner which will be discussed hereinafter.

The carriage 26 sometimes referred to as a transfer carriage includes a frame 56 having first and second end portions 51 and 52, respectively. The frame 56 carries four weight-bearing rollers 57 which engage the surfaces 42 on guide members 35 and 36. Engagement of these rollers is best seen in FIG. 7. There are additionally provided four lateral guidance rollers 60 carried by the frame 56 and these rollers serve to engage the lateral guidance surfaces 45, also, as best seen in FIG. 7 of the drawings. Vertical guide posts 62 are carried by the frame 56 and serve to guide a vertically movable saddle member 66 which is carried by the frame 56. The saddle member 66 is capable of movement between first and second vertical positions with its uppermost position shown at the left in FIG. 1 and its lowermost position shown at the right in FIG. 1.

A first supporting pad member 69 is carried by the saddle member 66 and includes a core engaging surface 70 and a tread ring engaging surface 71. The pad member 69 is made in two halves which are located on opposite sides of the saddle. This pad member 69 is pivotally connected to the saddle member as at 72 and first latch means 88 are provided to secure the pad member 69 in either one of the two positions. The latch means 88 includes bolts 90 movable back and forth by the actuation of levers 91 into recesses 92 and 93 in either end of the pad member. In the view of FIG. 1 at the left, it will be noted that the pad member 69 is supporting a tread ring 83 which is in engagement with surface 71, whereas at the right, the core engaging surface 70 is in engagement with and is supporting a core 82.

A second supporting pad member 76 is, also, carried by the saddle member 66 and it, also, includes a core engaging surface 77 and a tread ring engaging surface 78. The second supporting axis pad member is mounted for rotation about an axis by means of a pivotal mounting identified by the reference numeral 79 and best seen in FIG. 7. Second latch means 98 serve to secure the second supporting pad member 76 in one of two selected rotative positions as desired by an operator of the apparatus and the second latch means includes a bolt 100 actuated by means of a lever 101 which is movable into and out of a recess 102 in the saddle member (FIG. 7).

The drive means 32 for moving the carriage 26 back and forth between its first and second positions is provided and includes an idler sprocket 106 rotatably mounted adjacent the first position of the carriage and a drive sprocket 109 rotatably mounted adjacent the second position of the carriage 26. Included in the drive means is a drive motor 112 which for the sake of example may be a reversible 1750 rpm AC motor which includes a speed reducer and electromagnetic clutch and brake mechanism. A drive chain 114 is provided which extends through a guideway or passage 119 in the carriage 26 and at one end extends around the idler sprocket 106 and is secured to the first end of the carriage as indicated at 116 and at the other end of the drive chain it extends around the drive sprocket 109 and is secured to the second end of the carriage as at 117 (FIGS. 6 and 6A). It will be apparent that depending upon the direction of rotation of the drive motor 112, the carriage 26 will be moved between its first and second positions, best seen in FIG. 1. In one embodiment of the invention, this travel between the first and second positions is on the order of approximately 15 feet. The travel from the second position to the first position is accomplished by the drive means 32 with the exception of approximately the last 2 inches of travel to the left as seen in FIG. 1. In order to accomplish this last referred to travel there is provided what has been referred to as a pull-up mechanism 127, which is best seen in FIGS. 9 and 10. The pull-up mechanism includes a mounting plate 128 and a first lever member 129 is pivotally connected at its first end portion to the mounting plate and at its second end portion carries a roller member 130. A first arm 131 is rotatably mounted by a bracket 135 secured to the plate 128 and a link 132 is pivotally connected at one end to the first lever member 129 and at the other end to the first arm 131. Second arms 134 are rotatably mounted on the same axis as the first arm 131 and when rotated, also, rotate the first arm thereby moving the first lever member 129 and the roller member 130 between the full line position of FIG. 9 and the dotted line position. A piston and cylinder arrangement 139 is carried by the mounting plate 128 and the piston rod portion thereof is pivotally connected to the second arm 134 at 140 so that when the piston and cylinder arrangement is actuated the second arm 134 is rotated with subsequent movement of the first arm link, first lever member and the roller member 130. It will be seen from FIG. 9 that the roller member 130 is adapted to engage a wall 142 on the first end of the carriage 26 in moving from the dotted line position of FIG. 9 to the full line position of FIG. 9. As mentioned above, the movement of the carriage from its second position to its first position, is caused by the drive means except for approximately the last 2 inches of travel. When the carriage has arrived near the first position, the piston and cylinder arrangement 139 is actuated causing the roller member 130 to engage wall 142 moving the carriage this last small increment of travel. This causes four guide bushings 133 mounted on the carriage 26, to travel onto four guide pins 136, which are fixedly located in a precise position adjacent the first position of the carriage 26. This causes the carriage 26 to be very accurately located in its first position. The carriage location mechanism 29 is comprised of the pull-up mechanism 127, guide bushings 133, adjustable stop member 144 and guide pins 136.

A vertical lifting means 123 is provided beneath the carriage 26 at its first position and includes a piston and cylinder arrangement 124 located in a position to engage the saddle member 66 to move the saddle member to its uppermost vertical position in which it is shown in the first position of the carriage at the left in FIG. 1. The carriage 26 is limited in its movement to the left or to its first position as shown in FIG. 1 by means of the adjustable stop member 144, which is adapted to engage the first end portion of the carriage. The adjustable stop member 144 is carried by an idler bracket 145, which also supports the idler sprocket 106.

The operation of the core transfer unit 20 is basically as follows:

The carriage 26 is located in its second position at the right end of the guideway 23 as seen in FIG. 1 with the core engaging the surfaces 70 and 77 holding a core 82 which, as shown in this embodiment, is made up of a number of arcuate segments. The drive motor 112 is actuated which causes the drive chain 114 to move the carriage 26 along the guideway a distance of on the order of 15 feet from the second position to the first position, with the exception of approximately the last 2 inches of travel. When the carriage 26 has arrived at this position, the piston and cylinder arrangement 139 is actuated causing the roller member 130 to engage wall 142 (FIG. 9) which positively moves the carriage this last 2 inches to the left into engagement with the adjustable stop member 144 and securely moves the bushings 133 onto the guide pins 136 thereby accurately locating the carriage. The piston and cylinder arrangement 124 is then actuated causing the saddle member 66 and the core 82 to be moved vertically to position the axis of the core in a precise position with respect to a casting machine where it is appropriately supported. The piston and cylinder arrangement 124 is then reversed, lowering the saddle member 66 and the piston and cylinder arrangement 139 is next actuated moving the roller member 130 out of engagement with the wall 142. The drive motor 112 is then actuated and the carriage 26 is transported from the first position shown at the extreme left of FIG. 1 back to the second position.

While the core is being utilized in the casting of a vehicle tire, the first and second supporting pad members 69 and 76 are manipulated so as to bring the tread ring engaging surfaces 71 and 78 into active position. After the tire has been cast, the drive motor 112 is actuated moving the carriage 26 from the second position to the first position as previously described, with the last two inches of travel being accomplished by means of actuation of the piston and cylinder arrangement 139 and subsequent engagement of the roller member 130 with the wall 142. The saddle member 66 is raised vertically by means of the piston and cylinder arrangement 124 whereby the tread ring engaging surfaces 71 and 78 engage the tread ring 83 which surrounds the perimeter of the cast vehicle tire 85 with, of course, the core 82 being disposed in the interior of the tire. The saddle member 66 is then vertically lowered and the carriage 26 is moved from its first position to its second position by reversal of the drive motor 112. The completed vehicle tire 85 with the core 82 and tread ring 83 are removed, at the second position of the carriage, and are separated from each other and the procedure is repeated with the transporting of a new core 82 to the casting machine in the manner previously described.

Although this invention has been described in its preferred form with a certain degree of particularity, it is understood that the present disclosure of the preferred form has been made only be way of example and that numerous changes in the details of construction and the combination and arrangement of parts may be resorted to without departing from the spirit and the scope of the invention as hereinafter claimed.

What is claimed is:

1. Core transfer apparatus for a tire making machine including in combination a generally horizontally extending guideway extending between first and second positions, said guideway comprising first and second guide rails each having horizontal weight bearing surfaces and vertical lateral guidance surfaces, a transfer carriage having first and second end portions and movable back and forth between said first and second positions in said guideway and comprising a frame having first rollers engaging said weight bearing surfaces and second rollers engaging said vertical lateral guidance surfaces to movably support said carriage, an idler sprocket rotatably supported at said first position and a drive sprocket rotatably supported at said second position, motive drive means for driving said drive sprocket, a drive chain fixedly secured at one end to said first end portion of said carriage, extending over said idler sprocket, across the distance between said first and second positions, over said drive sprocket and fixedly secured at another end to said second end portion of said carriage, said frame having a plurality of vertically extending guide rods, a saddle member carried by said frame and adapted to move between first and second vertical positions relative thereto in movement guided by said guide rods, first and second supporting pad members carried by said saddle member and each pad member having a core engaging surface and a tread ring engaging surface, said first pad member being pivotally connected to said saddle member for pivotal movement about a horizontal axis between first and second positions, said second pad member being pivotally connected to said saddle member for pivotal movement about a vertical axis between first and second positions, first and second latch means for securing said first and second pad members respectively in said first and second positions, vertical lifting means at said first position of said carriage for moving said saddle member between said first and second vertical positions, a pull-up mechanism located at said first position and engageable with said carriage when said carriage has moved closely adjacent said first position whereby said carriage is positively moved to and held in said first position, guide bushings on said frame having their axes generally horizontal, guide pins located at said first position and being received in said guide bushings when said carriage is moved to said first position thereby accurately securing said carriage in said first position.

2. A core transfer apparatus as claimed in claim 1, wherein said pull-up mechanism comprises a first lever member pivotally mounted at its first end portion and having a roller member carried at its second end portion which roller member is adapted to engage said carriage, a first arm rotatably mounted, a link member pivotally connected at one end to said first lever member and at another end to said first arm, a second arm rotatably mounted on the same axis as said first arm and when rotated, also, rotating said first arm, and a piston and cylinder arrangement connected to said second arm to rotate the same and thereby move said lever member about its pivoted mounting.

3. Core transfer apparatus including in combination a generally horizontally extending guideway extending between first and second positions, a transfer carriage having first and second end portions and movable back and forth between said first and second positions in said guideway and comprising a frame, an idler sprocket rotatably supported at said first position and a drive sprocket rotatably supported at said second position, motive drive means for driving said drive sprocket, a drive chain fixedly secured at one end to said first end portion of said carriage, extending over said idler sprocket, across the distance between said first and second positions, over said drive sprocket and fixedly secured at another end to said second end portion of said carriage, said frame having a plurality of vertically extending guide rods, a saddle member carried by said frame and adapted to move between first and second vertical positions relative thereto in movement guided by said guide rods, first and second supporting pad members carried by said saddle member and each pad member having a core engaging surface and a tread ring engaging surface, said first pad member being pivotally connected to said saddle member for pivotal movement about a horizontal axis between first and second positions, said second pad member being pivotally connected to said saddle member for pivotal movement about a vertical axis between first and second positions, first and second latch means for securing said first and second pad members respectively in said first and second positions, vertical lifting means at said first position of said carriage for moving said saddle member between said first and second vertical positions, a pull-up mechanism located at said first position and engageable with said carriage when said carriage has moved closely adjacent said first position whereby said carriage is positively moved to said first position, guide bushings on said carriage having their axes generally horizontal, guide pins located at said first position and being received in said guide bushings when said carriage is moved to said first position thereby accurately securing said carriage in said first position.

4. Core transfer apparatus including in combination a generally horizontally extending guideway extending between first and second positions, a transfer carriage having first and second end portions and movable back and forth between said first and second positions in said guideway and comprising a frame, drive means for driving said carriage between said first and second positions, said frame having vertically extending guide means, a saddle member carried by said frame and adapted to move between first and second vertical positions relative thereto in movement guided by said guide means, first and second supporting pad members carried by said saddle member and each pad member having a core engaging surface and a tread ring engaging surface, said first pad member being pivotally connected to said saddle member for pivotal movement about a horizontal axis between first and second positions, said second pad member being pivotally connected to said saddle member for pivotal movement about a vertical axis between said first and second positions, first and second latch means for securing said first and second pad members respectively in said first and second positions, vertical lifting means at said first position of said carriage for moving said saddle member between said first and second vertical positions, a pull-up mechanism located at said first position and engageable with said carriage when said carriage has moved closely adjacent said first position whereby said carriage is positively moved to said first position, guide bushings on said carriage having their axes generally horizontal, guide pins located at said first position and being received in said guide bushings when said carriage is moved to said first position thereby accurately securing said carriage in said first position.

5. Core transfer apparatus including in combination a generally horizontally extending guideway extending between first and second positions, a transfer carriage having first and second end portions and movable back and forth between said first and second positions in said guideway and comprising a frame, drive means for driving said carriage between said first and second positions, said frame having vertically extending guide means, a saddle member carried by said frame and adapted to move between first and second vertical positions relative thereto in movement guided by said guide means, first and second supporting pad members carried by said saddle member and each pad member having a core engaging surface and a tread ring engaging surface, said first pad member being pivotally connected to said saddle member for pivotal movement about a horizontal axis between first and second positions, said second pad member being pivotally connected to said saddle member for pivotal movement about a vertical axis between first and second positions, latch means for securing said first and second pad members respectively in said first and second positions, vertical lifting means at said first position of said carriage for moving said saddle member between said first and second vertical positions, guide bushings on said carriage having their axes generally horizontal, guide pins located at said first position and being received in said guide bushings when said carriage is moved to said first position thereby accurately securing said carriage in said first position.

6. Core transfer apparatus including in combination a guideway extending between first and second positions, a transfer carriage having first and second end portions and movable back and forth between said first and second positions in said guideway and comprising a frame, drive means for driving said carriage between said first and second positions, said frame having guide means, a saddle member carried by said frame and adapted to move between first and second positions relative thereto in movement guided by said guide means, first and second supporting pad members carried by said saddle member and each pad member having a core engaging surface and a tread ring engaging surface, said first pad member being connected to said saddle member for movement between first and second positions, said second pad member being connected to said saddle member for movement between first and second positions, and lifting means at said first position of said carriage for moving said saddle member between said first and second positions.

7. A transfer carriage for a core transfer apparatus having first and second end portions and comprising a frame having rollers for travel in a guideway, said frame having a plurality of vertically extending guide rods, a saddle member carried by said frame and adapted to move between first and second vertical positions relative thereto in movement guided by said guide rods, first and second supporting pad members carried by said saddle member and each pad member having a core engaging surface and a tread ring engaging surface, said first pad member being pivotally connected to said saddle member for pivotal movement about a horizontal axis between first and second positions, said second pad member being pivotally connected to said saddle member for pivotal movement about a vertical axis between first and second positions, and latch means for securing said first and second pad members respectively in said first and second positions.

8. A transfer carriage comprising a frame, said frame having guide means, a saddle member carried by said frame and adapted to move between upper and lower positions relative thereto in movement guided by said guide means, first and second supporting pad members carried by said saddle member and each pad member having a first engaging surface and a second engaging surface, said first pad member being pivotally connected to said saddle member for pivotal movement about an axis between first and second positions, said second pad member being pivotally connected to said saddle member for pivotal movement about another axis between first and second positions, and means for selectively securing said first and second pad members respectively in said first and second positions and means for moving said saddle member between said upper and lower positions.

* * * * *